(12) United States Patent
Peppe et al.

(10) Patent No.: US 10,432,642 B2
(45) Date of Patent: *Oct. 1, 2019

(54) SECURE DATA CORRIDORS FOR DATA FEEDS

(71) Applicant: T-Mobile USA, Inc., Bellevue, WA (US)

(72) Inventors: Brett Peppe, Plano, TX (US); Greg Reith, Federal Way, WA (US)

(73) Assignee: T-Mobile USA, Inc., Bellevue, WA (US)

(*) Notice: Subject to any disclaimer, the term of this patent is extended or adjusted under 35 U.S.C. 154(b) by 43 days.

This patent is subject to a terminal disclaimer.

(21) Appl. No.: 15/394,170

(22) Filed: Dec. 29, 2016

(65) Prior Publication Data
US 2017/0163654 A1 Jun. 8, 2017

Related U.S. Application Data

(63) Continuation-in-part of application No. 15/276,567, filed on Sep. 26, 2016.

(60) Provisional application No. 62/233,153, filed on Sep. 25, 2015.

(51) Int. Cl.
*H04L 29/06* (2006.01)
*G06F 21/62* (2013.01)
*G06F 21/60* (2013.01)

(52) U.S. Cl.
CPC .......... *H04L 63/105* (2013.01); *G06F 21/606* (2013.01); *G06F 21/6218* (2013.01); *G06F 21/6245* (2013.01); *H04L 63/101* (2013.01); *H04L 63/102* (2013.01); *G06F 2221/2113* (2013.01)

(58) Field of Classification Search
CPC .................................................... H04L 63/105
See application file for complete search history.

(56) References Cited

U.S. PATENT DOCUMENTS

| 8,065,713 | B1 | 11/2011 | Vainstein et al. |
| 8,285,983 | B2 | 10/2012 | Fasbender |
| 8,321,387 | B2 * | 11/2012 | Dettinger ............ G06F 21/6227 707/694 |
| 8,322,610 | B2 | 12/2012 | Guthery |
| 8,528,047 | B2 | 9/2013 | Terzis et al. |

(Continued)

FOREIGN PATENT DOCUMENTS

| WO | 2010106552 A2 | 9/2010 |
| WO | 2014130920 A1 | 8/2014 |

OTHER PUBLICATIONS

The Final Office Action for U.S. Appl. No. 15/276,567, dated Dec. 10, 2019, 35 pages.

(Continued)

*Primary Examiner* — Simon P Kanaan
(74) *Attorney, Agent, or Firm* — Han Santos, PLLC

(57) ABSTRACT

A system and method of providing a secure data corridor are provided. A request from a subject for at least one data element of a data feed is received. A use-case is identified for the data feed. A security label is assigned to the use-case. A clearance of the subject is compared to the security label of the use-case. Upon determining that a clearance of the subject is at or above the data sensitivity rating of the use-case, the subject is allowed access privilege to the data feed via the secure data corridor.

20 Claims, 12 Drawing Sheets

(56) References Cited

U.S. PATENT DOCUMENTS

| | | | |
|---|---|---|---|
| 8,639,625 B1 | 1/2014 | Ginter et al. | |
| 8,732,856 B2 | 5/2014 | Sack et al. | |
| 8,938,775 B1* | 1/2015 | Roth | G06F 21/606 |
| | | | 726/1 |
| 9,215,236 B2 | 12/2015 | Kennedy | |
| 9,935,772 B1 | 4/2018 | Madisetti et al. | |
| 10,033,702 B2 | 7/2018 | Ford et al. | |
| 10,042,782 B2 | 8/2018 | Struttmann et al. | |
| 2006/0053158 A1 | 3/2006 | Hall et al. | |
| 2006/0059567 A1 | 3/2006 | Bird et al. | |
| 2006/0095762 A1 | 5/2006 | Hosokawa et al. | |
| 2006/0232826 A1 | 10/2006 | Bar-El | |
| 2008/0195858 A1 | 8/2008 | Nguyen | |
| 2010/0299362 A1 | 11/2010 | Osmond | |
| 2011/0078774 A1 | 3/2011 | Grube et al. | |
| 2014/0090085 A1 | 3/2014 | Mattsson et al. | |
| 2014/0173686 A1 | 6/2014 | Kgil et al. | |
| 2014/0283107 A1 | 9/2014 | Walton et al. | |
| 2014/0373104 A1 | 12/2014 | Gaddam et al. | |
| 2015/0089575 A1 | 3/2015 | Vepa et al. | |
| 2015/0163206 A1 | 6/2015 | McCarthy et al. | |
| 2015/0256559 A1* | 9/2015 | Porras | G06F 21/53 |
| | | | 726/1 |
| 2015/0310188 A1 | 10/2015 | Ford et al. | |
| 2015/0324571 A1 | 11/2015 | Hernoud et al. | |
| 2015/0339497 A1* | 11/2015 | Kurian | G06F 21/78 |
| | | | 726/34 |
| 2016/0072844 A1 | 3/2016 | Porras | |
| 2016/0275303 A1 | 9/2016 | Narayanaswamy et al. | |
| 2016/0277368 A1 | 9/2016 | Narayanaswamy et al. | |
| 2017/0041296 A1 | 2/2017 | Ford et al. | |
| 2017/0093913 A1 | 3/2017 | Summers et al. | |
| 2017/0237747 A1 | 8/2017 | Quinn et al. | |
| 2017/0264619 A1 | 9/2017 | Narayanaswamy et al. | |
| 2017/0264640 A1 | 9/2017 | Narayanaswamy et al. | |
| 2017/0277774 A1 | 9/2017 | Eigner et al. | |
| 2017/0364450 A1 | 12/2017 | Struttmann | |
| 2017/0364698 A1 | 12/2017 | Goldfarb et al. | |
| 2017/0364699 A1 | 12/2017 | Goldfarb et al. | |
| 2017/0364700 A1 | 12/2017 | Goldfarb et al. | |
| 2017/0364701 A1 | 12/2017 | Struttmann | |
| 2017/0366353 A1 | 12/2017 | Struttmann | |
| 2017/0373104 A1 | 12/2017 | Tatani et al. | |
| 2018/0205552 A1 | 7/2018 | Struttmann et al. | |

OTHER PUBLICATIONS

The Non-Final Office Action for U.S. Appl. No. 15/394,148 dated Oct. 1, 2018, 17 pages.
European Patent Application 16849888.9, Search Report, dated Apr. 12, 2019, 11 pages.
International Search Report and Written Opinion for PCT Application No. PCT/US2016/053827, dated Jan. 11, 2017, 13 pages.
International Search Report and Written Opinion for PCT Application No. PCT/US2017/068680 dated Apr. 26, 2018, 12 pages.
International Search Report and Written Opinion for PCT Application No. PCT/US2017/068685 dated Apr. 24, 2018, 12 pages.
Non-Final Office Action for U.S. Appl. No. 15/276,567 dated May 31, 2018, 41 pages.
U.S. Appl. No. 15/276,567, Non-Final Office Action dated Apr. 1, 2019, 36 pages.
U.S. Appl. No. 15/394,148, Final Office Action dated Mar. 19, 2019, 33 pages.
U.S. Appl. No. 15/394,148, Notice of Allowance dated Jun. 24, 2019, 51 pages.

\* cited by examiner

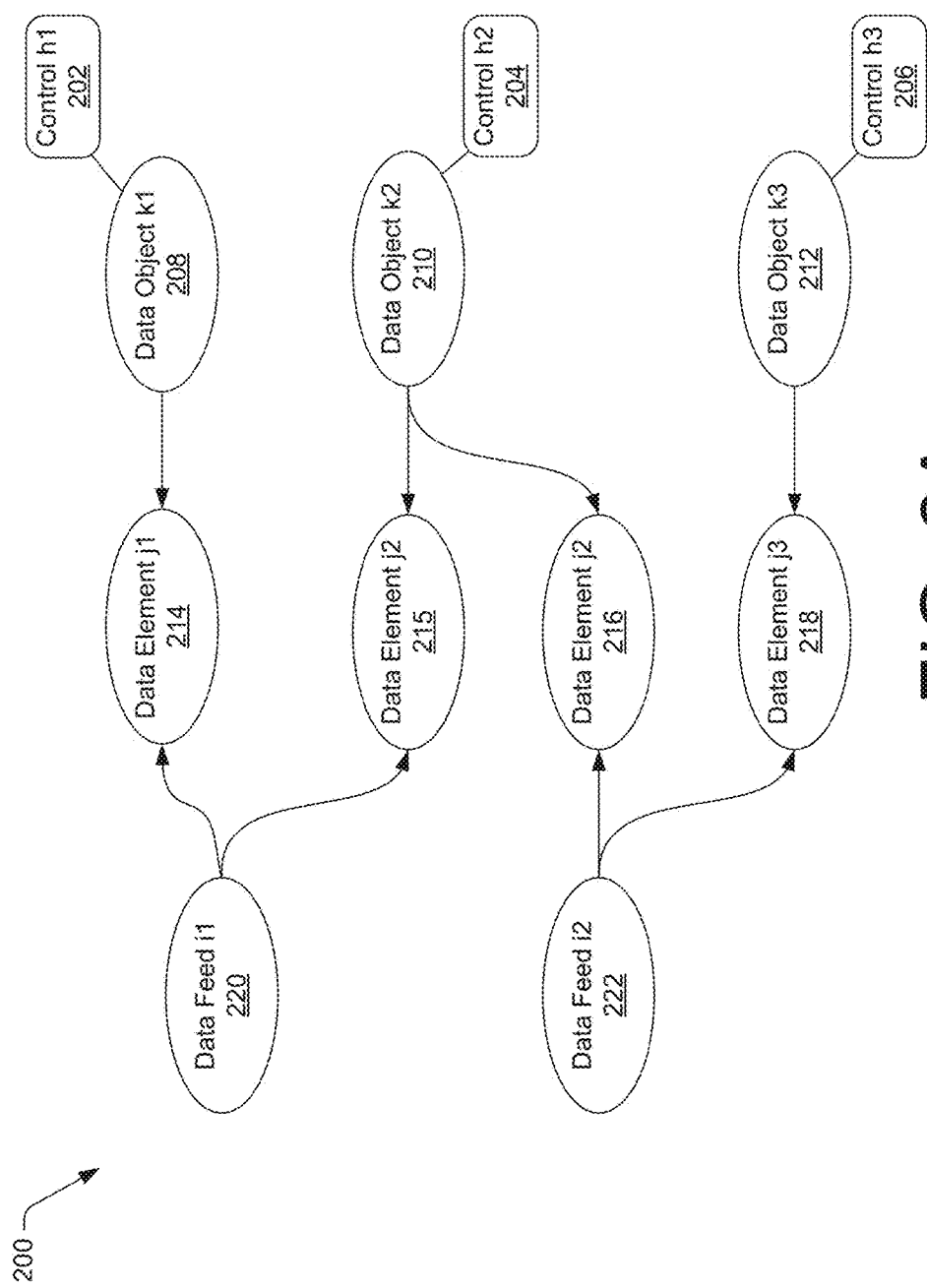

| Control | Up | Down |
|---|---|---|
| Read | 0 | 2 |
| Write | 1 | 0 |

SECURE DATA CORRIDORS FOR DATA FEEDS

RELATED APPLICATIONS

This application is a Continuation in Part of U.S. application Ser. No. 15/276,567 filed on Sep. 26, 2016, which claims benefit under 35 USC § 119 of U.S. Provisional Patent Application No. 62/233,153 filed on Sep. 25, 2015, and titled "Distributed Big Data Security Architecture," which are herein incorporated by reference in their entirety.

BACKGROUND

Traditional information technology (IT) architecture has relied on centralized computing structures, whereby all or most of the processing and computing is performed on a central server. Centralized computing can enable the deployment of central server computing resources, administration, and management. Typically, computational processing involves the extraction, transformation and loading of a resultant data feeds by the centralized computing structure. Security for data feeds is typically provided by securing the computational nodes.

However, cost and performance inefficiencies of centralized computing structures have steered IT architectures towards decentralized computing structures, whereby data feeds are extracted, uploaded to a decentralized computing platform and then transformed. Doing so provides cost and performance efficiencies since the infrastructure to perform the computational processing can be outsourced to an entity that specializes in such.

As decentralized computing develops, both the velocity and diversity of data can cause some security measures to have an impact on latency, scalability, and recovery performance. Security risk has evolved beyond solely the computational node and now includes network connections between those nodes. Thus, security can be viewed as a service constraint.

Security permissions are usually mapped to an object (system, file, database, etc.) and checked on subject request for operation via an Access Control Lists (ACLs). These ACL's are intended to support "authentication," "authorization," and "auditing." However, in most modern enterprise systems these capabilities have become separated. For example, authentication is deferred to an "authoritative master;" in authorization, the permissions depend on the "objects in scope;" and in auditing, the logging specifics depend on the "events in scope."

Because these security tasks have become functionally separated, the cost to keep them reasonably synchronous in a large enterprise often becomes so high that critical permissions maintenance and audit may not be performed. For example, the basic security on a file system may be statically mapped to folders and files. One either has the necessary permissions to list, read, write (accept) or one does not (deny). The subject is authenticated (e.g., mapped to a known principal) and authorized. Auditing occurs at the object level. However, the file system may be blind to the data that participates. One strategy to deal with this fundamental weakness is a multilevel classifications system (like Bell-LaPadula). However, such system still depends on static specifications.

Data may be classified by business sensitivity and risk controls, which in turn are factored into the permissions granted to an object. In this regard, subjects derive permissions to data based on their assigned clearance to the underlying secure data corridor. The data layer is now sensitive to the import, transformation, viewing and export of such data. A more modern form of the ACL would integrate risk and auditing. Such integration implies that metadata associated with risk controls and data sensitivity is stored in the security hive. As such, these decisions no longer reside in the application layer, but are verified and enforced at the system level.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 2A illustrates a block diagram of an informational graph that describes the relationship between data objects, data elements, and data feeds within a use-case and/or secure data container, consistent with an exemplary embodiment.

DETAILED DESCRIPTION

Overview

Figure 1:
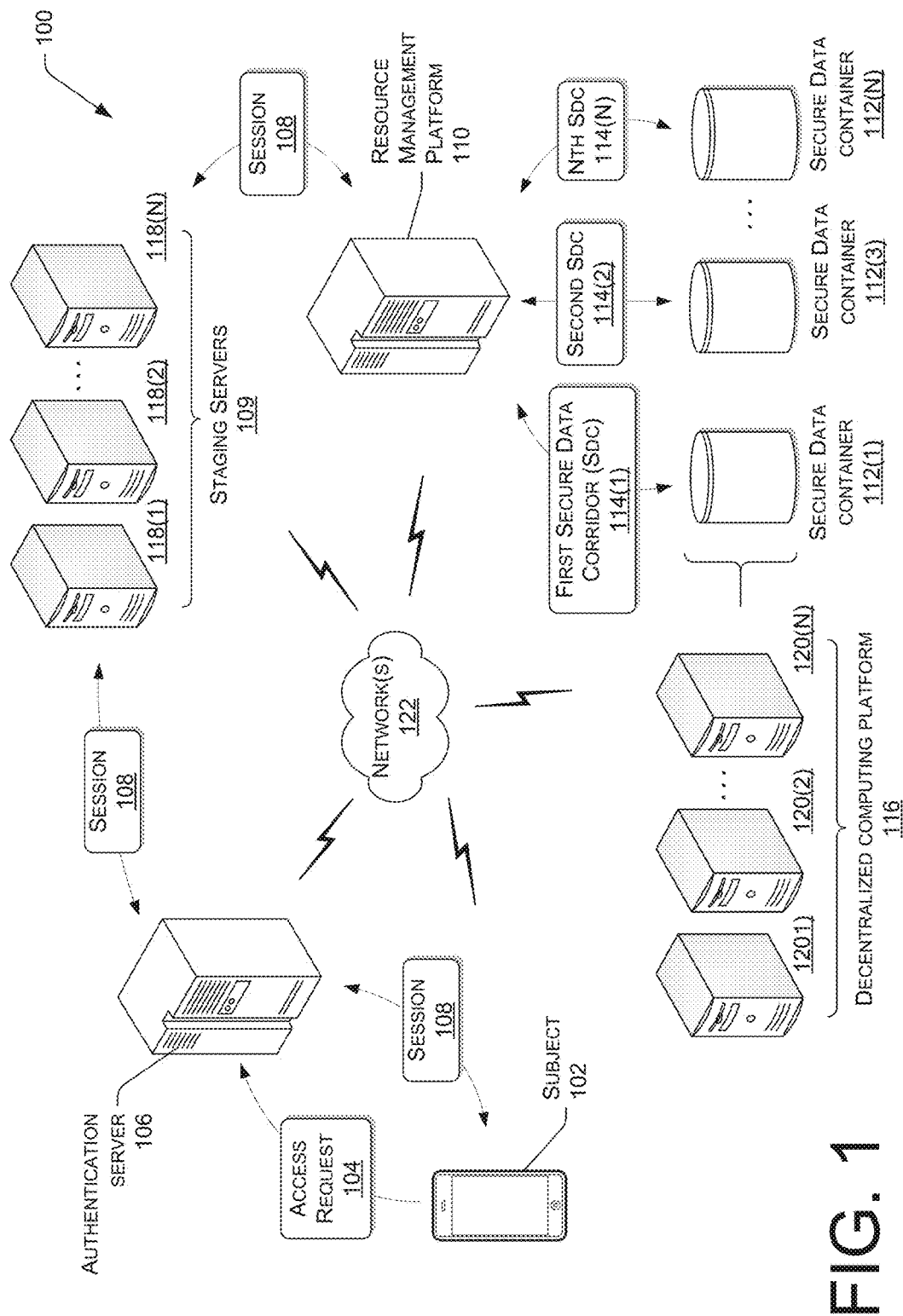
FIG. 1 illustrates a schematic view of an architecture that facilitates establishing a secure session between a subject and a secure data container via a secure data corridor.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure generally relates to data security, and more particularly, to access control in a distributed computing environment. Techniques are described for defining security measures of a "secure data corridor" that enables data feeds to transmit from an ingress point to an egress point, while maintaining a desired level of security protection.

The term "secure data corridor" as used herein describes a communication channel used to transmit data feeds from a source location (i.e., ingress point) to a destination location (i.e., egress point) within a distributed computing environment. The techniques described herein further associate a secure data corridor with security measures that mandate access and/or confidentiality protection and/or data integrity protection that is commensurate with the nature of the data feed. For example, a data feed that relates to proprietary vendor data that is preferentially withheld from public dissemination may be associated with a less sensitive security measure when compared with a data feed that relates to personal consumer information that should be withheld from public dissemination. In various examples, security measures may be defined, and enforced by explicit, read, write, import and export provisions expressly associated with data feeds. Further, any other regime that is definable by a developer or an administrator, may be used to define security measures.

In various examples, data items, sometimes referred to herein as data objects, are an instantiation of a data element. They may be classified by use-case, and risk controls may be applied based on the sensitivity of data that is maintained within each use-case. Each use-case may be classified and assigned to a "security label," which defines the minimum security clearance required for a subject to access any data feed associated therewith. The term "data sensitivity rating" is used herein to describe a rating, or score, given to a data feed that quantifies the security measure that mandates a predetermined confidentiality protection and data integrity protection. Using the above mentioned example, a data feed that is associated with personal consumer information to be withheld from public dissemination is likely to be assigned a more sensitive, that is higher, data sensitivity rating, relative to a data feed that relates to proprietary vendor data that is preferentially withheld from public dissemination.

Each data sensitivity rating may prompt one or more control parameters that protect the confidentiality and integrity of the data feed. The one or more control parameters may include principles such as no read-up, no write-down, tranquility, explicit read-in, and explicit write-out. The 'no read-up' principle refers to a condition whereby a subject at a given security level may not read a data feed at a high security level. A 'no write-down' principle refers to a condition whereby a subject at a given security level may not write to a data feed to a less sensitive security level. A 'tranquility' level refers to a condition where an object that is once classified to a level, remains at that level. The term "explicit read-in" refers to a condition where landing permissions are explicitly granted (i.e., they are not default). In contrast, the term 'explicit write-out' refers to a condition where export permissions are explicitly granted (i.e., they are not default). The term "subject" as used herein describes a user, a non-user entity, a secure data container, or any other data structure requesting access permissions to data feeds within a secure data container, and via a secure data corridor.

In various examples, the classification of a "data sensitivity rating" may be associated directly with data elements and set by predetermined rules. In some examples, a default data sensitivity rating may be assigned to a secure data corridor. In other examples, the data sensitivity rating may be based on access privileges associated with the subject. Further, the data sensitivity rating of the secure data corridor may be dynamically set by interrogating the nature of the data feed that is transmitting through the secure data corridor. In some examples, the data sensitivity rating may be set in substantially real-time.

The term "data feed" as used herein represents groups of potentially streamed data elements used in an import or export operation. A data feed may include one or more data elements, which in turn are associated with data objects. A data feed may be assigned a default control parameter that applies to all data elements in the feed. A data feed may have default controls and acquired controls. Acquired controls may supersede default controls. The ability to set default controls on a data feed may facilitate loading data into the cluster that requires transformation after loading, but still requires protection. A data feed may have zero to many associated data elements.

The term "data element" as used herein describes the physical and logical characteristics of an associated data type. It is a datum or a collection thereof. Further, a data element may define a data type as a string, integer, float, or object. Data elements may be associated with one to several data feeds as driven by the needs of a business use case. The data elements map to data feeds. Data objects map to a data element. Data objects, store the data value at a particular storage location.

In some examples, the control parameters are assigned to the data objects. The data elements that are associated with the data objects inherit control parameters from the data objects. Further, the data feed that is associated with the data elements inherit the control parameters from the data elements, and ultimately from the data objects. The level of the control parameters is dependent on the use-case. Thus, in one embodiment, the security model may be customized for different use-cases. In other words, a use-case may be associated with a specific security label, and all data feeds and objects associated with the use-case may be assigned a data sensitivity rating, specific to the security label. Thus, a subject with access to a use-case may have access to all data and services that are assigned to the use-case, provided that the subject retains the requisite access permissions.

Each use-case, may have its own namespace, which can be enforced by a resource management platform. Privileges and permission are attached to the namespace. The term 'namespace' is used herein to describe a set of symbols used to identify objects that are used to organize those objects (which may be of various kinds), so that those objects may be referred to by that identifying set of symbols. In this way, the identifying set of symbols is the name of that object. The act of informing a system that the name of the object corresponds to that object is called "binding." Because names may be desirable to use in multiple use-cases, a namespace itself may have a name to identify that namespace, and used to qualify names for that use-case. For example, consider there are two use-cases, called Use-Case1 and Use-Case2. Say that both use-cases have an object called "MainObject." Use of names spaces can distinguish MainObject for Use-Case1 and for Use-Case2 by referring to the former as Use-Case1.MainObject and Use-Case2.MainObject. In this way, object names need not be unique across all use-cases, and namespace names allow a logical way to group objects for that use-case.

In a non-limiting example, a namespace may include identifiers within the context of file systems, programming languages, and computer networks and distributed systems. Further, a namespace may also include a secure data container having one or more data feeds.

In various examples, a subject may be added to an Access Control List (ACL) on the authentication service principals in order to gain access to a secure data corridor. Generally, a subject assigned to a given data sensitivity rating may access all data within that same classification.

This disclosure further describes techniques that illustrate multiple layers of authentication, authorization, and auditing of separate platform levels. As used herein, authentication is the verification and validation of credentials presented by a subject to an authoritative master (e.g., an authentication server) that either accepts or rejects the subject. Acceptance of the credentials assigns an identity to the subject. Authorization is the granting of system resources, privileges and/or permissions to a subject. Auditing is the collection, maintenance, and reporting of Access Control Management (ACM) records.

By virtue of the multiple layers of authentication, a single point of attack (SPOA) in the security trust chain can be avoided as any successful attack would need to be of a synchronized multi-point nature. Elements of a defense may include controlling access to the resource management platform by an authentication server entry. Authentication may be performed by an Active Directory (represented later herein as an authentication server), whereby a subject may provide a set of credentials that confirm their identity. In a non-limiting example, the credentials may include a username, password, or other biometric identifier. Further, authorization to access a secure data container, via a secure data corridor is dependent on the assigned access privileges and the data sensitivity rating of an associated use-case and data feed within the secure data container.

A secure data corridor (SDC) may comprise a secure data container (having one or more data feeds) and trust chain vertices. A trust chain is created by a directed graph of vertices between SDC's. Each vertex may be a physical computational node, but more commonly, could be a software module. The traversal of a given trust chain not only verifies the integrity of the chain, but also enables an audit mechanism. The secure data container is, in essence, embedded within the data corridor. The trust chain vertices define logical input and output pathways to the embedded data container. In other words, a secure data corridor connotes a transport mechanism and in its basic pathway operates as a migration pathway of physical data.

In various examples, the secure data corridor may correspond to a link layer, a network layer, a transport layer, a session layer, or an application layer of a network protocol. For example, for the network, transport and session layers, the corresponding network protocol may be transmission control protocol (TCP) and internet protocol (IP). For the application layer, the network protocol may be hypertext transfer protocol (HTTP).

In a non-limiting example, a secure data corridor may include one input, one output, and one container. In a second non-limiting example, a secure data corridor may include one container with one input and no outputs. In this example, the SDC can act as a secure sink where data of an unknown sensitivity rating can be staged prior to being class-rated into other containers, and other secure data corridors. In a third non-limiting example, the secure data corridor may include a secure data container with multiple outputs and no input. In this example, the secure data corridor input may be disconnected, once data is migrated. The multiple outputs, that is to say the vertices, may connect to several other secure data corridors.

Each SDC may include a base set of applicable security controls having a security label. The data elements used in an SDC are mapped to these controls. Different controls may have different confidentiality, integrity, and auditing requirements. A given data item may be tagged by as many controls as appropriate.

All data elements (DE) used in a SDC may be registered in a SDC data dictionary (DD). Each data element can participate in one or more data feeds (DF), which represent groups of data elements used in an IMPORT or EXPORT operation. Each use-case has one or more data feeds and represents the complete set of data used to solve a particular problem domain. An SDC may include at least one use-case. In one embodiment, an SDC includes the following information: which use-case(s) are active for a data feed; what data feed(s) participate in each use case; the active data dictionary; which security labels are active and the data elements mapped to the security labels; which data elements are associated with a data feed; and which subject used, viewed, or modified which use-case, data feed, and/or data element.

In one embodiment, there is a data linkage map set (DLMS), which is a table used by a secure data channel verifier to determine permissions on data objects via their security label. For example, the DLMS defines the valid data triples (e.g., data feed, data element, and security control) for an authoritative master (e.g., authentication server) within the secure data channel as a linear map-set. A given data element may be tagged by as many controls as necessary. For example, controls may relate to the Payment Card Industry Data Security Standard (PCI DSS), customer proprietary network information (CPNI), Sarbanes-Oxley (SOX), etc.

In one embodiment, the DLMS includes a date/time stamp that captures the data/time of when a write operation created the entry of a data object, as illustrated in table 1 below.

TABLE 1

Example Data Linkage Map Set

| Data Feed | Data Element | Control | Date/Time |
|---|---|---|---|
| $DF_1$ | $DE_1$ | $C_1$ | Sep. 26, 2014; 6:08 PM |
| $DF_2$ | | $C_2$ | Sep. 26, 2014; 6:18 PM |

The DLMS may be used as a reference to determine whether a requesting subject has clearance to a data object by having clearance to the data feed, data element(s), and controls within. In the example of Table 1, the security label for the first use-case is $\{DF_1, DE_1, C_1\}$. Accordingly, the requesting subject must have clearance to $\{DF_1, DE_1, C_1\}$ for a data object.

In one embodiment, there is a subject linkage map set (SLMS), which is a table used by the secure data channel verifier to determine subject clearances to data objects. It defines the valid subject triples for the authoritative master within the secure data channel. In this regard, Table 2 below provides three different use-cases.

TABLE 2

Example Subject Linkage Map Set

| Data Feed | Subject | Control | Date/Time |
|---|---|---|---|
| $DF_3$ | $S_3$ | $C_3$ | Sep. 26, 2014; 6:08 PM |
| $DF_4$ | $S_4$ |  | Sep. 26, 2014; 6:18 PM |
|  | $S_5$ | $C_5$ | Sep. 26, 2014; 6:39 PM |

The empty fields in Table 2 above indicate that there are no subject linkages that have been defined within the secure data channel. In the example of Table 2, for the first use-case, the subject clearance level need be at or above the security label $\{DF_3, DE_3, C_3\}$. Accordingly, the DLMS permits both the $DF_3$ and $C_3$ to $DE_3$. For the second use-case, the subject clearance level need be at or above the security label $\{DF_4, DE_4, \text{null}\}$. Accordingly, the DLMS permits both the $DF_4$ and $C_4$ to $DE_4$. For the third use-case, the subject clearance level need be at or above the security label $\{\text{null}, DE_5, C_5\}$. Accordingly, the DLMS permits all DF and $C_5$ to DE under all DF.

The term "data container," as used herein, describes a data structure that includes data items associated with the operation of a particular application. For example, a data container of a particular application and its dependencies may include an operating system, one or more data item libraries, configuration files, application binaries, and other parts of a technology stack used for execution of the particular application. Unlike a traditional virtual machine, a data container may hold its application and any dependencies. However, a same operating system kernel and libraries can be shared between multiple containers running in a host environment.

The term "attribute based access control" (ABAC) relates to a security model that maps attributes against access controls. It is an access control method, where a subject request to perform operations on objects are granted based on assigned attributes of the subject, assigned attributes of the object, environment conditions, and a set of policies that re specified in terms of those attributes and conditions. In ABAC, both the subject and object agree synchronously on the mediated attribute sets for access control. If the attributes are not consistently defined, then a formal ABAC is not feasible. In one aspect, ABAC can avoid a static (i.e., subject/object operation) pair lookup.

The principles described herein may be applicable to any distributed computing environment. Historical protection techniques include network (e.g., IP address), firewall (e.g., Ports, Services), platform (e.g., Folder, Share) and data (e.g., Schema, Table) segmentation.

The term "techniques," as used herein, may refer to system(s), method(s), computer-readable instructions, module(s), algorithms, hardware logic, and/or operation(s) as permitted by the context described above and throughout the document.

Example Architecture

FIG. 1 illustrates a schematic view of an architecture 100 that facilitates establishing a secure session 108 between a subject 102 and a secure data container via a secure data corridor. In the example of FIG. 1, the subject 102 may transmit an access request 104 to an authentication server 106. In some examples, the authentication server 106 may perform authentication by an Active Directory, whereby the subject 102 may provide a set of credentials that confirm their identity. In a non-limiting example, the credentials may include a username, password, or other biometric identifier associated with the subject. In various examples, the subject 102 may correspond to a user, a non-user entity, a secure data corridor, or any other data structure that is capable of requesting access permissions to data feeds within a secure data container.

The subject 102 may interface with the authentication server 106 via any sort of electronic device, such as a cellular phone, a smart phone, a tablet computer, an electronic reader, a media player, a gaming device, a personal computer (PC), a laptop computer, etc. Further, the electronic device of the subject 102 may include a subscriber identity module (SIM), such as an eSIM, to identify the electronic device of the subject 102 to a telecommunication service provider network (also referred to herein as "telecommunication network").

In the illustrated example, in response to authenticating the subject 102, a session 108 is initiated via the authentication server 106 between the subject 102, through the staging server(s) 109. The decentralized cluster security policy balances the need to provide scalable aggregation while still maintaining isolation based on security classifications. Isolation may be based on authorization and via the staging server(s) 109.

Further, the staging server(s) 109 are communicatively coupled to a resource management platform 110. The resource management platform 110 may establish a communicative connection between a subject 102 and one or more secure data container(s) 112(1), 112(2), or 112(N), via a secure data corridor 114(1), 114(2), and 114(N), respectively. In various examples, the secure data corridor 114(1), 114(2), and 114(N) correspond to a link layer, session layer, a network layer, a transport layer, or an application layer of a transmission control protocol (TCP) and internet protocol (IP). In a non-limiting example, a secure data corridor may include one input, one output, and one container. In a second non-limiting example, a secure data corridor may include one container with one input and no outputs. The one or more secure data containers 112(1), 112(2), or 112(N) may be stored within a decentralized computing platform 116. The one or more secure data containers 112(1), 112(2), or 112(N) may include a data structure that includes data items associated with the operation of a particular application. For example, a data container of a particular application and its dependencies may include an operating system, one or more data item libraries, configuration files, application binaries, and other parts of a technology stack used for execution of the particular application.

The staging server(s) 109 and the decentralized computing platform 116 may operate on one or more distributed computing resource(s), respectively. The one or more distributed computing resource(s) may include one or more computing device(s) 118(1) to 118(N) and 120(1) to 120(N), respectively, which operate in a cluster or other configuration to share resources, balance load, increase performance, provide fail-over support or redundancy, or for other purposes. The one or more computing device(s) 118 and 120 may include one or more interfaces that enable communications with electronic device(s), such as an electronic device associated with the subject 102, via one or more network(s) 122.

In the illustrated example, the one or more network(s) 122 may include public networks such as the Internet, private networks such as an institutional and/or personal intranet, or some combination of private and public networks. The one or more network(s) 122 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Example Data Feeds

FIG. 2A illustrates a block diagram of an informational graph 200 that describes the relationship between data objects, data elements, and data feeds within a use-case and/or secure data container, consistent with an exemplary embodiment. In the illustrated example, control parameters 202, 204, and 206 may be assigned to data objects 208, 210, and 212, respectively. The control parameters may include principles such as no read-up, no write-down, tranquility, explicit read-in, and explicit write-out. The 'no read-up' principle refers to a condition whereby a subject at a given security level may not read a data feed at a high security level. A 'no write-down' principle refers to a condition whereby a subject at a given security level may not write to a data feed to a less sensitive security level.

In the illustrated example of FIG. 2A, the data objects 208, 210, and 212 inherit the respective control parameters 202, 204, and 206 from the data feeds 220 and 222, or the mapping data elements 214, 215, 216, and 218 that define them. A data element may define the physical and logical characteristics of an associated data type. For example, a data element may define a data type as a string, integer, float, or object. Further, a data element may further define a risk rating or a generic sensitivity rating (collectively referred to herein as a security level) of the associated data. In some examples, the security level may change over time. The security level may also change to reflect a directed or explicit sensitivity policy. Further, a data element may define a data type as a string, integer, float, or object. The data objects store the data value at a particular storage location. The data feeds 220 and 222 that are associated with the data elements 214, 216, and 218 inherit the control parameters from the data elements 214, 216, and 218, and ultimately from the data objects 208, 210, and 212. Each data element is not limited to be associated with one data object. For example, data element 216 may be associated not only with data object 210, but also with one or more additional data objects (not shown). Thus, several data objects may be associated with a single data element. Further, one data object (e.g., 210) may be associated with several data elements (e.g., 214 and 216). In some embodiments, a data element is a singleton in that there is only one instance of the data element. Put differently, in various embodiments, data feeds may map to a single data element (i.e., singleton) or a collection of data elements. In one embodiment (not shown) a data element may be associated with a plurality of data feeds.

Figure 2B:
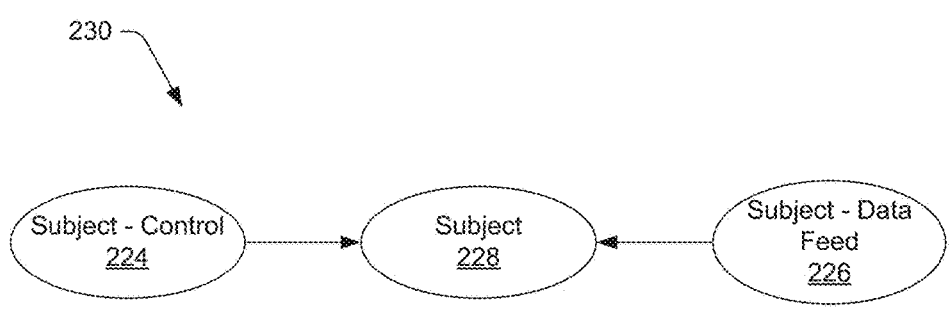
FIG. 2B illustrates a block diagram of a diagraph that represents subject permissions to specific control parameters and a specific data feed, consistent with an exemplary embodiment.

FIG. 2B illustrates a block diagram of a diagraph that represents subject permissions to specific control parameters 224 and a specific data feed 226, consistent with an exemplary embodiment. A subject 228 is mapped to controls 224 and data feeds 226. In the illustrated example, permissions associated with the subject 228 are bound to specific control parameters 224 and stored in a list of triples 230 (i.e., subject, control, and data feed) that tie the subject 228 to specific controls, and correspondingly, the subject to the data feeds that are tagged by the specific controls. In some examples, the subject 228 may be granted access permissions to data feeds, whereby the access is governed by the specific control parameters specified in the list of triples 230. The data feeds 226 and specific control parameters 224 may be explicitly assigned. Alternatively, or additionally, the subject 228 may be granted access to all data elements that are qualified by a specific control parameter.

Further, the resource management platform may interrogate the list of triples 230 associated with the subject to determine privileged data feeds as well as the controls that determine the access rights to those data feeds. The control parameters 224 may be expressed as a data sensitivity lattice of varying levels, as further described in FIGS. 3A and 3B.

Example Permission Lattice

Figures 3A, 3B:
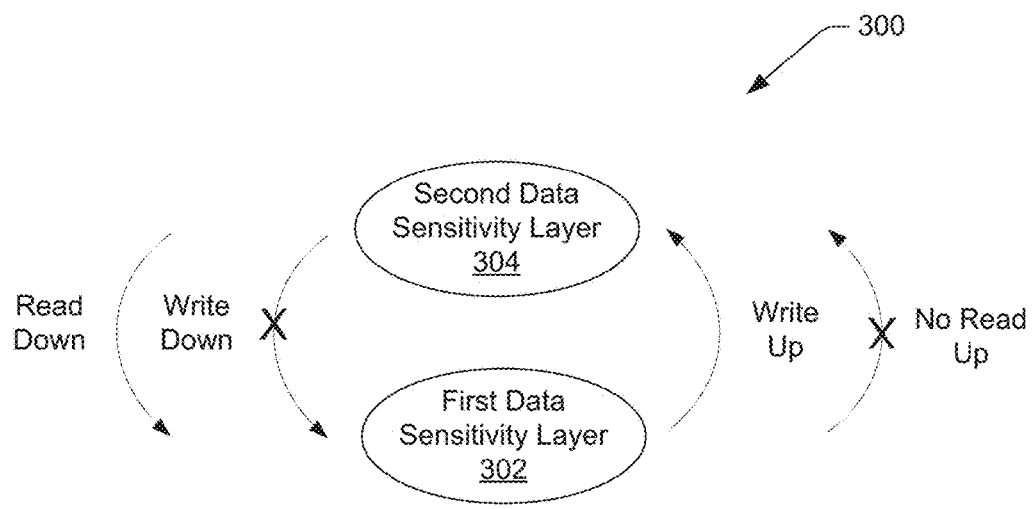
FIG. 3A illustrates a block diagram of an exemplary permission lattice associated with granting access permissions to a subject.
FIG. 3B illustrates a data sensitivity lattice that associates control parameters with data feeds.

FIG. 3A illustrates a block diagram of an exemplary permission lattice 300 associated with granting access permissions to a subject. In various examples, a subject may correspond to a user, a non-user entity, a secure data container, or any other data structure requesting access privileges. Particularly, FIG. 3A illustrates a block diagram of a data sensitivity lattice 300. In some examples, the data sensitivity lattice 300 may include a first data sensitivity layer 302 and a second data sensitivity layer 304. In the illustrated example, the first data sensitivity layer 302 may be associated with a first set of data items that mandate low security measures for data confidentiality and data integrity protection. In a non-limiting example, the first set of data items may correspond to proprietary vendor data that is preferentially withheld from public distribution. Comparatively, the second data sensitivity layer 304 may be associated with a second set of data items that mandate more data security measures relative to the first data sensitivity layer 302, for data confidentiality and data integrity protection. In a non-limiting example, the second set of data items may correspond to personal consumer information that must be withheld from public distribution. For illustrative purposes only, FIGS. 3A and 3B present a two-layer data sensitivity lattice 300. It is noteworthy that the data sensitivity lattice 300 may be defined to include any number of layers favored by a developer or administrator, as discussed in more detail later in the context of the description of FIGS. 3C and 3D.

FIG. 3A illustrates the relative flow of read and write permissions between the first data sensitivity layer 302 and the second data sensitivity layer 304. Although FIG. 3A describes read and write permissions, permissions may further include import permissions, export permissions, or any other permission regime definable by a developer or administrator. In the illustrated example, a subject with access permission to the first data sensitivity layer 302 may write data items to the second data sensitivity layer 304. However, the subject may not read data items within the second data sensitivity layer 304. In other words, the subject may add (i.e., write) data items to the more sensitive, second data sensitivity layer 304, however the subject may not access, that is read, data items within the more sensitive, second data sensitivity layer 304.

FIG. 3A further illustrates that a subject with access permission to the second data sensitivity layer 304 may read data items within the first data sensitivity layer 302, however the subject may not write data items within the first data sensitivity layer 302. In other words, the subject may read data items within the less sensitive, first data sensitivity layer 302, however the subject may not add (i.e., write) data items to the less sensitive, first data sensitivity layer 302.

A subject with access permission to the first data sensitivity layer 302 may read data items and write data items within the first data sensitivity layer 302. Similarly, a subject with access permission to the second data sensitivity layer 304 may read data items and write data items within the second sensitivity layer 304. Note that the terms data sensitivity layer and data sensitivity rating may be used interchangeably to describe the data sensitivity of a data item. Further the term data item may be used interchangeably to describe data feed.

FIG. 3B illustrates a data sensitivity lattice 306 that associates control parameters with data feeds. The control parameters are tied to data feeds. The control parameters may include read, write, export, and import parameters. For example, consider a subject with access permission to the second data sensitivity layer 304. As illustrated in FIG. 3A, the subject may read data items within the first data sensitivity layer 302, but may not add (i.e., write) data items to the first data sensitivity layer 302. The write limitation ensures that the subject may avoid inadvertently having more sensitive data items from the second data sensitivity layer 304 being added to the less sensitive first data sensitivity layer 302. The data sensitivity lattice 306 of FIG. 3B reflects the same, except access permissions are presented from the perspective of the data feed, rather than the subject.

For example, FIG. 3A illustrates the second data sensitivity layer 304 as the most data sensitivity layer. Thus, the second data sensitivity layer 304 can only interact downward with the first data sensitivity layer 302. In FIG. 3B, the interaction of the second data sensitivity layer 304 with the first data sensitivity layer 302 is reflected in the 'down' column of the data sensitivity lattice 306. The 'down' column indicates a capability to read down (i.e., '1' in the read—down cell), and an inability to write down (i.e., '0' in the write—down cell).

Similarly, as shown FIG. 3A, a subject with access permissions to first data sensitivity layer 302 may not read data contained within the second data sensitivity layer 304, because the higher sensitivity of the second data sensitivity layer 304 represents more sensitively classified data. Using the previous example of proprietary vendor data and consumer personal data, a subject with permission access to proprietary vendor data (i.e., classified as first data sensitivity level layer 302) cannot read the consumer personal data (i.e., classified as the second data sensitivity level layer 304).

Figures 3C, 3D:
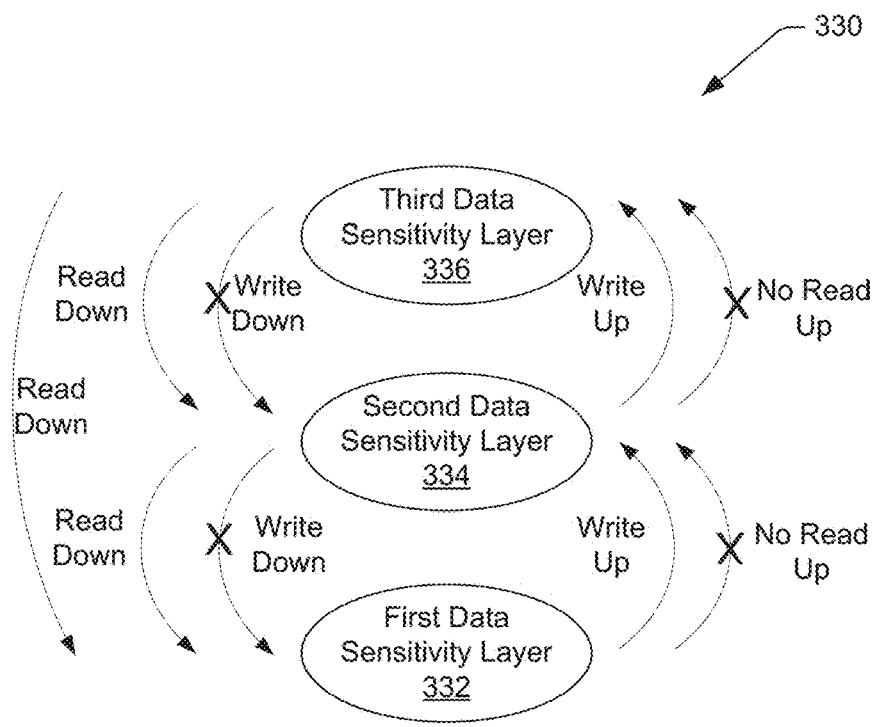
FIG. 3C illustrates a block diagram of an exemplary permission lattice having several sensitivity layers.
FIG. 3D illustrates a data sensitivity lattice that associates control parameters with data feeds. The control parameters are tied to data feeds.

It should be noted that permissions are not limited to a first and second sensitivity layer. In various embodiments, there may be any number of sensitivity layers that can be controlled for a subject. In this regard, FIG. 3C illustrates a block diagram of an exemplary permission lattice 330 having several sensitivity layers. By way of example, FIG. 3C illustrates three sensitivity layers 332, 334, and 336, while it will be understood that other number of sensitivity layers are supported as well. Accordingly, the data sensitivity lattice 330 may include a first data sensitivity layer 332, a second data sensitivity layer 334, and a third data sensitivity layer 336. In the illustrated example, the first data sensitivity layer 332 may be associated with a first set of data items that mandate low security measures for data confidentiality and data integrity protection. Comparatively, the second data sensitivity layer 334 may be associated with a second set of data items that mandate more data security measures relative to the first data sensitivity layer 332, for data confidentiality and data integrity protection. The third sensitivity layer 336 may be associated with a third set of data items that mandate more data security measures relative to the second data sensitivity layer 334.

In the illustrated example of FIG. 3C, a subject with access permission to the first data sensitivity layer 332 may write data items to the second data sensitivity layer 334 and the third sensitivity layer 336. However, the subject may not read data items within the second data sensitivity layer 334 or the third data sensitivity layer 336. In other words, the subject may add (i.e., write) data items to the more sensitive, second data sensitivity layer 334 and third sensitivity layer 336, but the subject may not access, that is read, data items within the more sensitive, second data sensitivity layer 334 and third data sensitivity layer 336.

FIG. 3A further illustrates that a subject with access permission to the third data sensitivity layer 336 may read data items within the second data sensitivity layer 334 and the first data sensitivity layer 332. However, the subject may not write data items within the second data sensitivity layer 334 and the first data sensitivity layer 332. In other words, the subject may read data items within the less sensitive, first and second data sensitivity layers 332 and 334, but the subject may not add (i.e., write) data items to the less sensitive, first and second data sensitivity layers 332 and 334. Note that the terms data sensitivity layer and data sensitivity rating may be used interchangeably to describe the data sensitivity of a data item. Further the term data item may be used interchangeably to describe data feed.

FIG. 3D illustrates a data sensitivity lattice 340 that associates control parameters with data feeds. The control parameters are tied to data feeds. The control parameters may include read, write, export, and import parameters. The controls in the lattice 340 need not be limited to "0" and "1" entries. Rather, in various embodiments, for a "read" operation, a "0" may indicate a permit for the subject to read at the same level; a "1" may indicate a permit for the subject to read one level down; a "2" may indicate a permit for the subject to read 2 levels down; and an "n" may indicate a permit for the subject to read any level down. A blank (i.e., "null") may explicitly deny a read or write, respectively.

Similarly, for a write operation, a "0" may indicate a permit for the subject to write at the same level; a "1" may indicate a permit for the subject to write one level up; a "2" may indicate a permit for the subject to write 2 levels up; and an "n" may indicate a permit for the subject to write to any level up.

Clearances are not explicitly assigned to subjects; rather, a subject acquires a clearance when permission to a control is granted. Each subject may have a singular clearance level for each granted control. If a subject is granted access to a control, then the subjects is permitted all data elements (and objects) referenced tagged by that control and data feed, unless it is explicitly denied.

Example Creation of a New Data Feed

Figure 4:
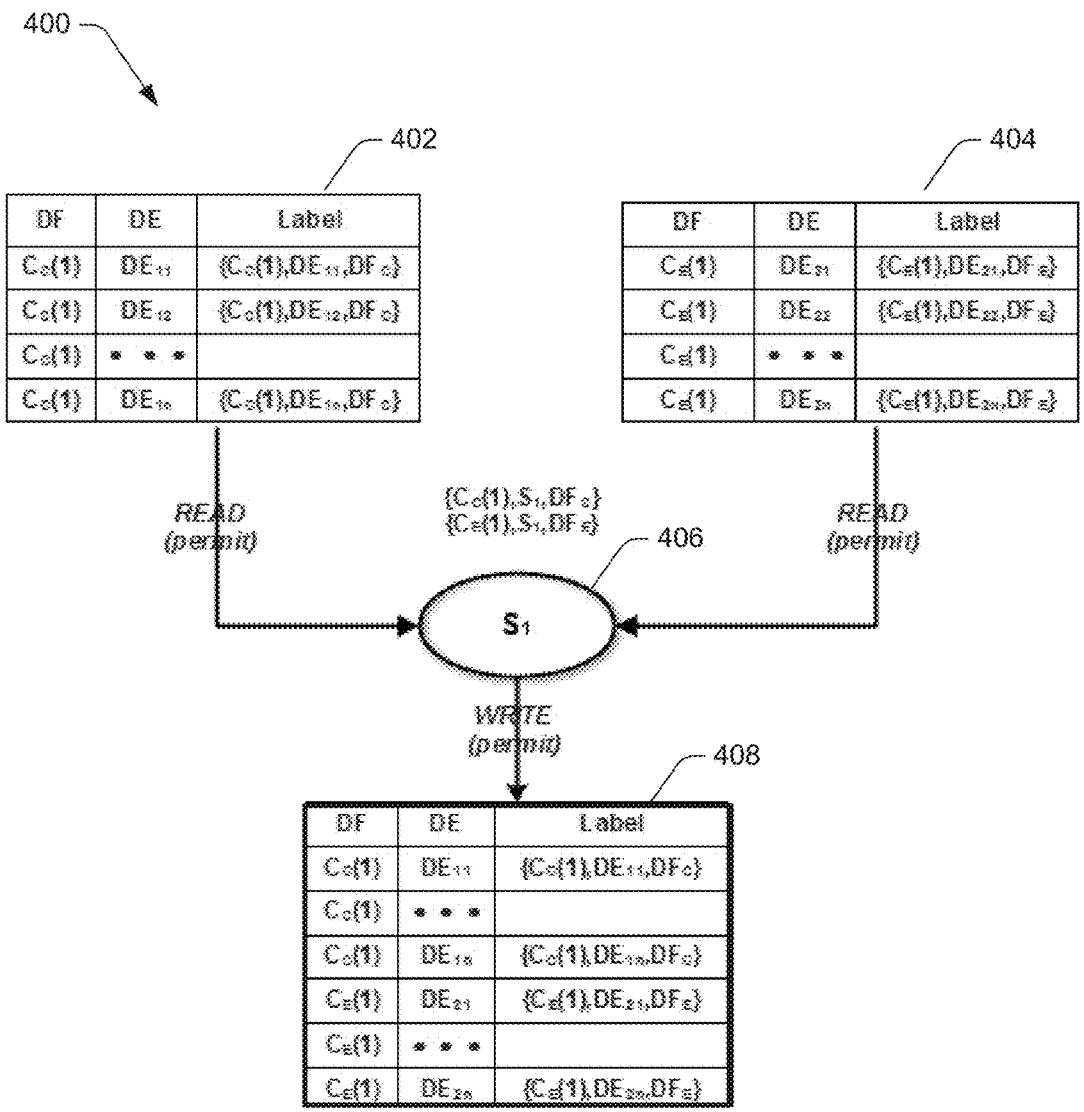
FIG. 4 illustrates the creation of a third data feed from two existing data feeds.

FIG. 4 illustrates the creation of a third data feed from two existing data feeds. For example, a subject 406 may have read access to several data feeds, represented by data feeds 402 and 404. The first data feed $C_{C(1)}$ includes data elements $DE_{11}$ to $DE_{1n}$, each data element having a corresponding security label, sometimes referred to herein as a data sensitivity rating. Similarly, the second data feed $C_{E(1)}$ includes data elements $DE_{21}$ to $DE_{2n}$, each with a corresponding security label. The subject 406 can create a new data feed 408 from the two existing data feeds 402 and 404 that includes the data elements of each data feed and its corresponding data sensitivity ratings. Accordingly, the subject 406 has read access to the first and second data feeds 402 and 404, and write access to the new third data feed 408.

In one aspect, data is classified by business use-case and applied risk controls (sensitivity). Subjects derive permissions to data objects based on their assigned clearance to the respective data corridor. This data layer is sensitive to the import, transformation, viewing and export of any data. Such architecture provides a unified platform for authorization and auditing in a business enterprise.

Applicants have developed the Secure Data Corridor (SDC) upon the realization that data ingestion, transformation, processing and extraction may not be adequately protected on large Big Data clusters using traditional Access Control Management (ACM) techniques. In a traditional approach, any failure in the contractual trust chain may make the entire cluster vulnerable. In one aspect, a security model (based on SDC's) is used that is secure by design via a Container Based Access Control (CBAC) technique with integrated Risk Controls, where: (i) containers are classified by data sensitivity and define processing corridors; (ii) containers may securely host multiple data pools at different risk levels; (iii) containers may dynamically re-rate themselves based on their contents; (iv) data feeds imported into containers are controlled by a risk rating (e.g., corridor on write); (v) work products extracted from containers are controlled by a risk rating (e.g., corridor on read); and (vi) container data pools can participate in overlays. A corridor on read (CoR) is the process by which an SDC verifier determines the permitted data feed state space on request for access internal to an SDC. The operators are read and write. Corridor on write (CoW) is the process by which an SDC verifier determines the permitted Data Feed state space on request for access external to an SDC. The operators are import and export.

It should be noted that control mappings may be assigned at both the data feed and data element level. If several data feeds participate in a single business use case, If an attack vector compromises a single SDC, the attack cannot be extended to other SDC's by way of architecture. In various scenarios, a Big Data cluster may include as many SDC's as appropriate. The concepts discussed herein may be applicable to any distributed computing environment.

Example Operations on a Data Feed

Figure 5:
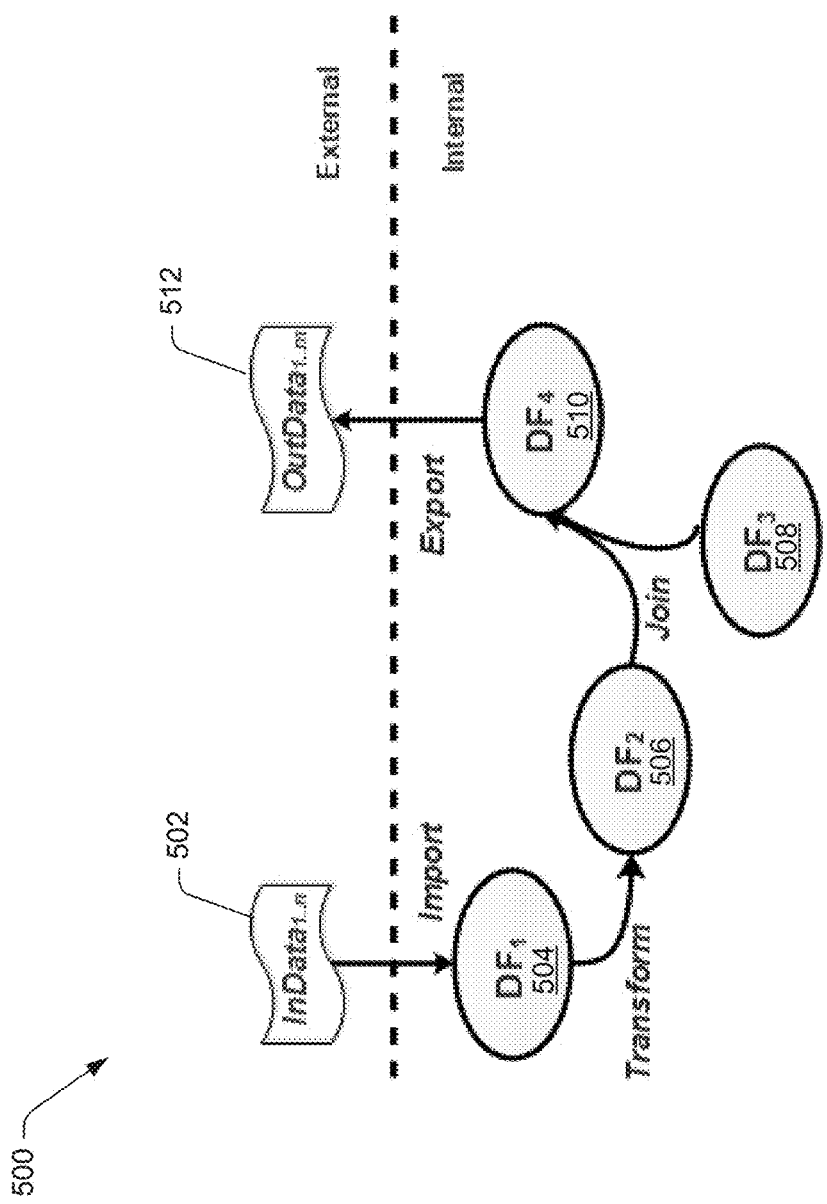
FIG. 5 illustrates data movement within a secure data channel as a digraph.

Since data feeds are a digraph, then any transformation of one or more data feeds is also a digraph. In this regard, FIG. 5 illustrates data movement within a secure data channel as a digraph. Data is imported from an external source 502 into the secure data channel as a first data feed 504. The second data feed 506 is created by transforming the first data feed 504. The fourth data feed 510 is created by joining the second and third data feeds 506 and 508. Data is then exported to a subject 512 outside of the secure data channel.

Mapping of Data Objects to Data Elements

Figure 6A:
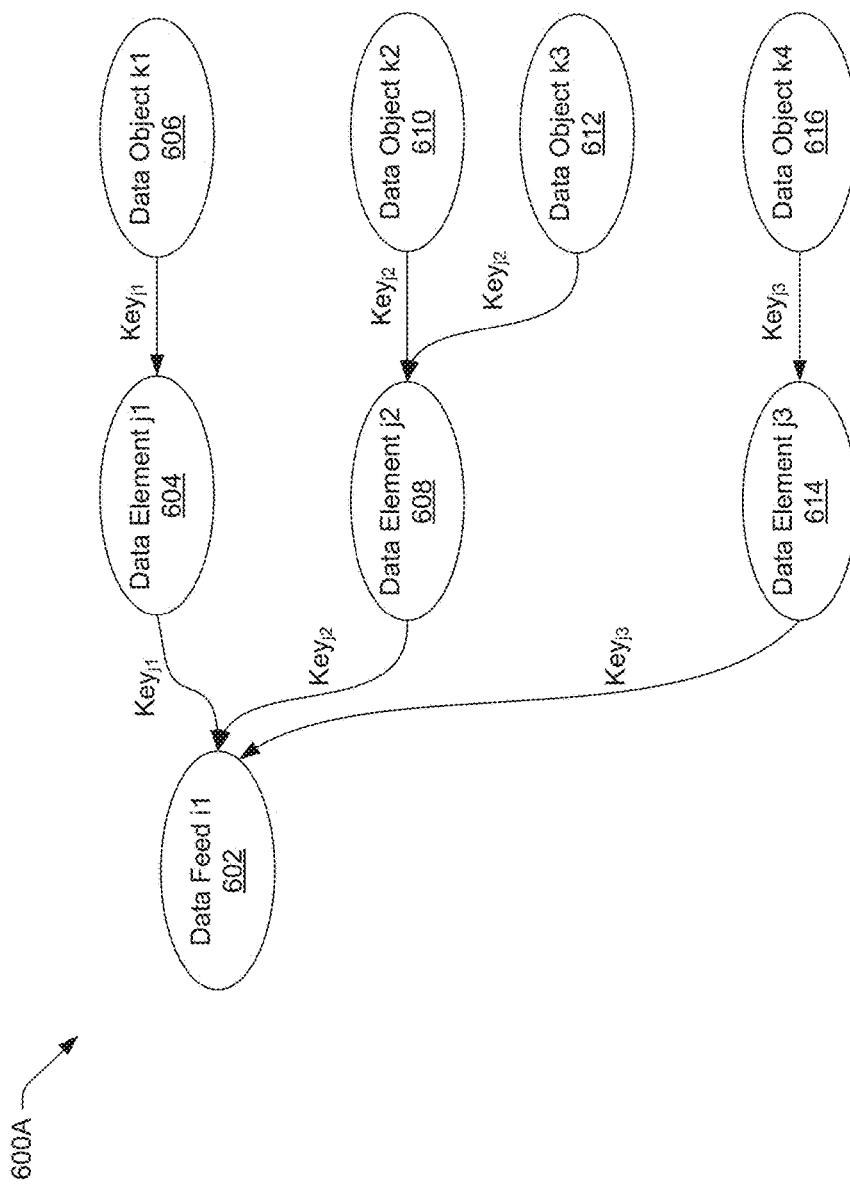
FIG. 6A illustrates a block diagram of an informational graph that includes keys between data objects, data elements, and data feeds within a use-case and/or secure data container.

FIG. 6A illustrates a block diagram of an informational graph that includes keys between data objects, data elements, and data feeds within a use-case and/or secure data container. In various embodiments, the same data element may map to more than one data object within the same data feed, as illustrated by data element 608 with respect to data objects 610 and 612. The DLMS maintains a lookup map-set of its mapped data feeds (DF), data elements (DE), and controls (C). Each data object includes a reference key back to its owning data element. Accordingly, data objects that belong to a set of data elements can be identified by searching the secure data channel for the referenced keyset. Every data feed is now an information graph of source, elements, and values. Such a graph can track the transformation history by adding a temporal dimension.

Figure 6B:
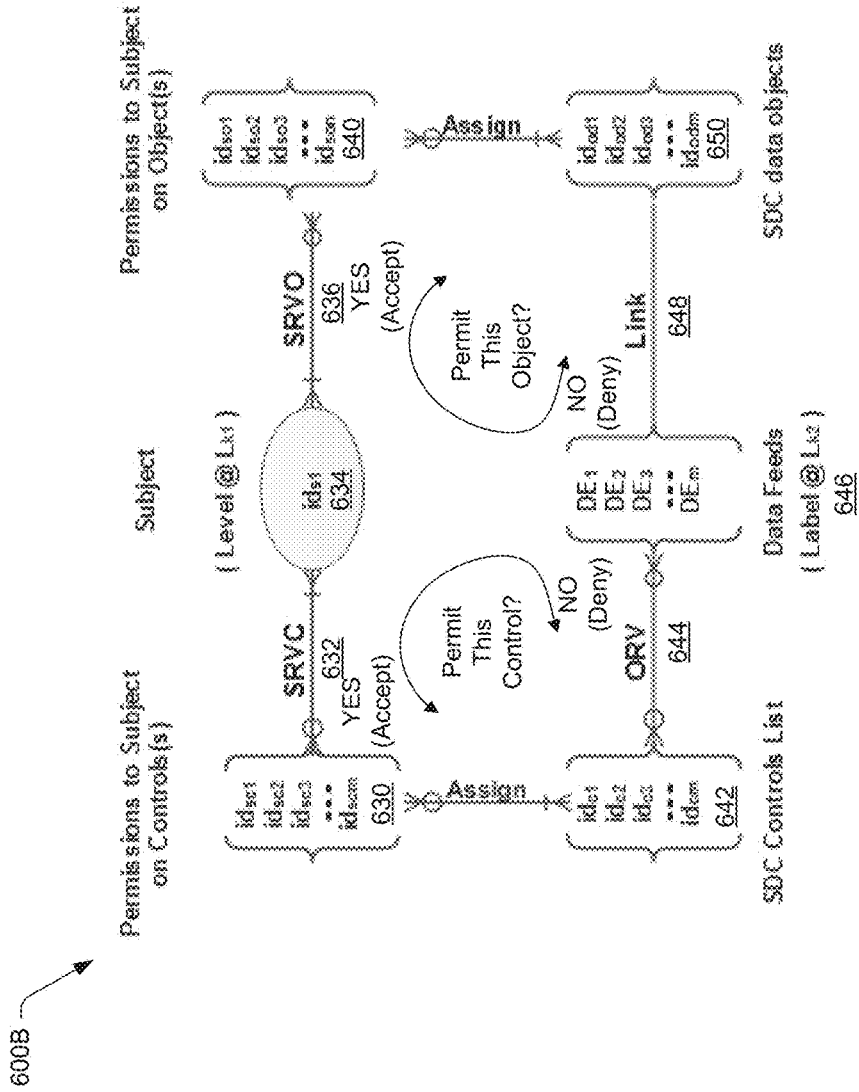
FIG. 6B illustrates a block diagram that describes a relationship between data elements, controls, and data feeds.

FIG. 6B illustrates a block diagram that describes the relationship between data elements, controls, and data feeds. FIG. 6B includes a subject risk vector to control SRVC 632, a subject risk vector to objects (SRVO) 636 connection, and an object risk vector (ORV) 644, and a link 648 between the data feeds and the SDC data objects 650. Data elements (DE) are tracked by controls 642 and data feeds (DF) 646. The data elements are mapped into data feeds 646. A data feed or data element can never "lose" the controls assigned to it, respectively. In one perspective, controls 642 assigned to a data feed or data element set can be thought of as a label or a sensitivity rating.

Likewise, Subjects are granted permission to the control 642, which can be cross mapped to data feed or data elements. The permissions (e.g., clearance) granted to the Subject should be at the same level or higher than required by the data feed or data element set. This facilitates a dynamic reset of the risk as the controls of the data feed or data element set are modified over time. In this regard, it is noted that traditional systems assign static permissions to subjects on object (e.g., files, folders, databases, schema, etc.,) that are blind to the risk controls. In an SDC, subjects are mapped to permissions on data feeds and clearance to a particular control level. Should the assigned Control level of the underlying data feed or data element set change, this is automatically supported.

Auditing Via Integrated Risk Controls

In one embodiment, a data element can be interpreted as a signature rather than a value. Secure data channel data objects store values that are redefined by data elements. In various scenarios, auditing may occur at different levels for different use-cases. As used in this context, auditing is the collection, maintenance, and reporting of Access Control Management (ACM) records. For example, such auditing may be performed at a system level, database level, application level, or data feed level. In various embodiments, at least one of the following aspects may be determined by way of audit: (i) which use-cases are active, (ii) what data feed(s) participate in each use-case, (iii) the active data dictionary for the secure data channel, (iv) which controls are active and the data elements mapped thereto, (iv) and which subject looked at which use-case data feed, and/or data element.

Figure 7:
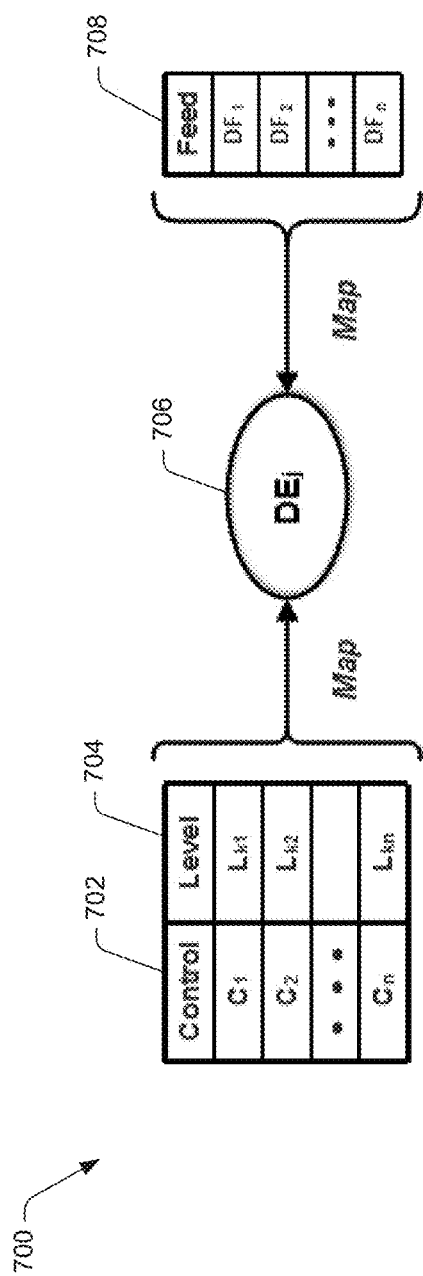
FIG. 7 illustrates a block diagram of a data diagraph with different controls, consistent with an exemplary embodiment.

FIG. 7 illustrates a block diagram of a data diagraph with different controls, consistent with an exemplary embodiment. The data element 706 may be attached to a plurality of controls 702. Each control may have an associated security level 704. The data element 706 is a metadata definition linked to controls 2302 and data feeds 2306. The data element 706 is assigned a clearance label ($L_k$) for each control 702. The data element 706 can be assigned a temporal or scoped nature such that its assigned label is modified.

Ingesting and Extracting Data Feeds into a Container

In one embodiment, since each container has a default classification (which may be dynamically assigned), these containers are sensitive to what kind of data that they can import. In this regard, data feeds are assigned a risk rating. One cannot write data at a higher risk level into a container with a lower risk rating. One can write data at a lower risk level into a container with a higher risk rating.

A secure corridor logs all inputs, processing, and outputs. For example, in Hadoop®, a YARN (a resource-management platform responsible for managing computing resources in clusters and using them for scheduling of users' applications) plugin may facilitate a "corridor on write," where data feeds are imported into a container. The data feed may be accepted, denied, imported, or overlaid.

In one embodiment, data may be extracted from a container. Since each container has a default classification and data pools with risk ratings, each container is sensitive to what kind of data it can export. In one example, each data sub-pool in a container may be marked to indicate whether it is "releasable" or "not-releasable." A data sub-pool marked at a lower level can export into a container rated at a higher level (i.e., write-up). However, such sub-pool cannot export to a container rated at a lower level (i.e., write-down). Any data sub-pool may participate in an overlay with another container as long as these rules are followed. For example, in Hadoop®, a YARN plugin may facilitate a "corridor on read," where work products extracted from containers are controlled by a risk rating. The data feed may be accepted, denied, exported, or overlaid.

Example Resource Management Platform

Figure 8:
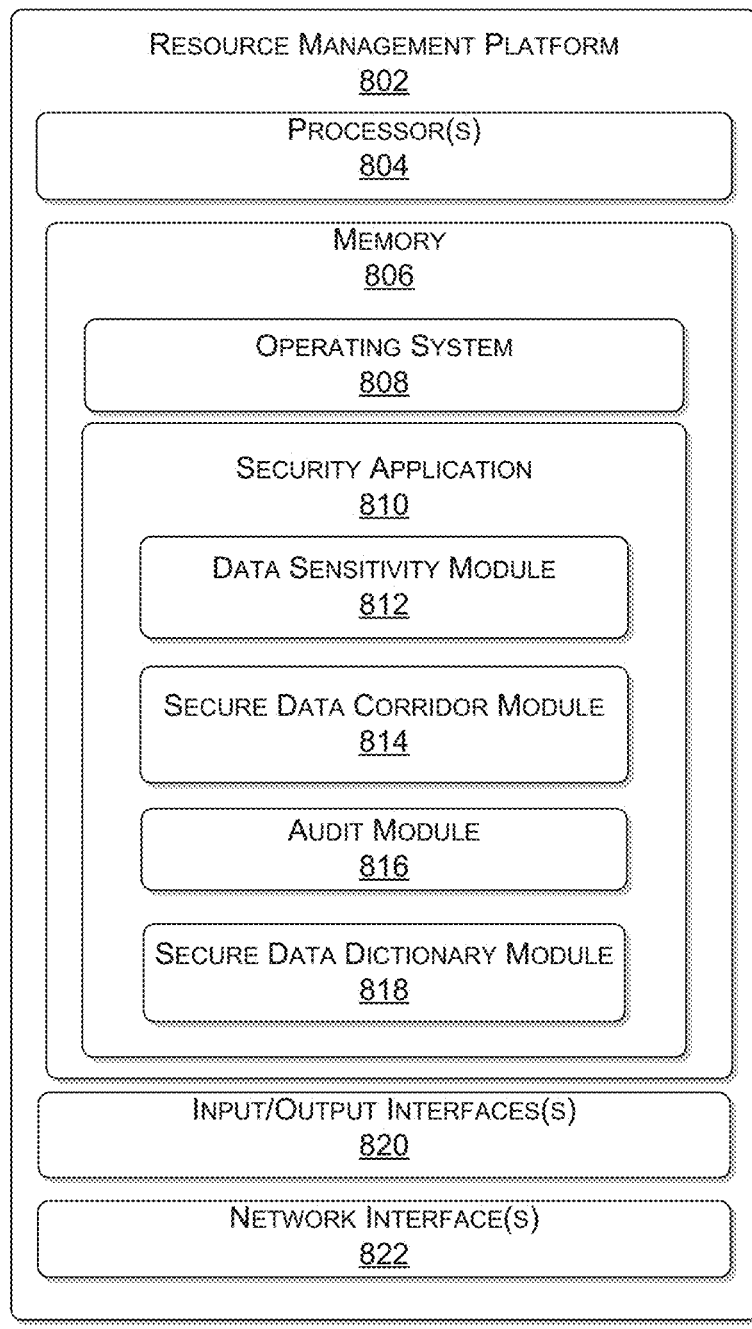
FIG. 8 illustrates a block diagram of a resource management platform that can establish a communicative connection between a subject and a secure data container via a secure data corridor.

FIG. 8 illustrates a block diagram of a resource management platform 802 that can establish a communicative connection between a subject and a secure data container having at least one data feed, via a secure data corridor. The secure data corridor may be configured with a security label that is substantially similar to a security label of an adjoining secure data container. In some examples, the subject may correspond to a user device, a non-user entity device, or another adjoining secure data container.

In the illustrated example, the resource management platform 802 may correspond to the resource management platform 110 of FIG. 1. Further, the resource management platform 802 may include one or more processor(s) 804 that are operably connected to memory 806. In at least one example, the one or more processor(s) 804 may be a central processing unit(s) (CPU), graphics processing unit(s) (GPU), both a CPU and GPU, or any other sort of processing unit(s). Each of the one or more processor(s) 804 may have numerous arithmetic logic units (ALUs) that perform arithmetic and logical operations as well as one or more control units (CUs) that extract instructions and stored content from the processor cache memory, and then executes these instructions by calling on the ALUs, as appropriate during program execution. The one or more processor(s) 804 may also be responsible for executing all computer applications stored in the memory, which can be associated with common types of volatile (RAM) and/or nonvolatile (ROM) memory.

In some examples, memory 806 may include a system memory, which may be volatile (such as RAM), non-volatile (such as ROM, flash memory, etc.,) or some combination of the two. The memory may also include additional data storage devices (removable and/or non-removable) such as magnetic disks, optical disks, tape, etc.

The memory 806 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 806 may include an operating system 808 and various applications, such as a security application 810 that may be used to provide a secure data corridor between a subject and a data feed of interest. Execution of the security application 810 by the processor(s) 802 configures the resource management platform 802 to perform various functions. In one embodiment, these functions may be controlled by different modules, such as a data sensitivity module 812, a secure data corridor module 814, an audit module 816, and a secure data dictionary module 818. The operating system 808 may be used to implement the data sensitivity module 812 and the secure data corridor module 814. The operating system 808 may be any operating system capable of managing computer hardware and software resources. The data sensitivity module 812, the secure data corridor module 814, the audit module 816, and the secure data dictionary module 818 may include routines, program instructions, objects, and/or data structures that perform particular tasks or implement particular abstract data types.

In the illustrated example, the data sensitivity module 812 may determine the data sensitivity rating to assign to a secure data corridor. In one example, the data sensitivity module 812 may detect a data sensitivity rating at an ingress and egress point of a secure data corridor. The ingress and egress points may interchangeably correspond to a subject and a secure data container, depending on the flow of data feeds. Thus, the data sensitivity module 812 may further assign a data sensitivity rating to the secure data corridor that corresponds with the determined data sensitivity rating at the ingress and egress points.

In a non-limiting example, the data sensitivity module 812 may quantify a data sensitivity rating of a secure data corridor based on access permissions associated with a subject. For example, the data sensitivity module 812 may detect that access permissions associated with the subject may limit the data sensitivity rating of data feeds that the subject may access. For example, if a subject is permitted to access data feeds with a first data sensitivity rating, whereby the first data sensitivity rating is less sensitive (i.e., mandates less data security measures for data confidentiality and data integrity protection) than a second data sensitivity rating, the data sensitivity module 812 may associate the first data sensitivity rating to a secure data corridor that establishes a session link between a secure data container and the subject. Doing so ensures that data feeds that egress from the secure container to the subject comply with access permissions of the subject and do not include data feeds that may be more sensitive (i.e., mandate more data security measures for data confidentiality and data integrity protection) than permitted by the subject access permissions.

In another non-limiting example, the data sensitivity module 812 may quantify a data sensitivity rating of the secure data corridor based on the data sensitivity rating of incoming data feeds that ingress from the subject to a secure data container. In other words, the data sensitivity rating of the secure data corridor may be based on the data sensitivity rating of incoming data feeds that are transmitting into the secure data container, rather than data feeds being accessed by the subject from the secure data container. In this example, the data sensitivity module 812 may quantify a data sensitivity rating for incoming data feeds and associate that data sensitivity rating to the secure data corridor that establishes a session link between the subject and the secure data container. Doing so ensures that incoming data feeds transmitting from the subject to the secure data container are protected while transmitting through the secure data corridor.

Further, in another non-limiting example, the data sensitivity module 812 may quantify a data sensitivity rating of the secure data corridor based on the data sensitivity rating of data feeds that transmit through the secure data corridor. In other words, the data sensitivity module 812 may detect the data sensitivity rating of data feeds transmitting through the secure data corridor, and dynamically set a substantially similar data sensitivity rating for the secure data corridor. A benefit of this approach is that in some instances, data feeds may have an unknown data sensitivity rating. As a precautionary measure, these data feeds may be assigned a high data sensitivity rating until determined otherwise. Thus to avoid assigning a secure data corridor with an arbitrary, and unnecessarily high data sensitivity rating that is based on a data feed with unknown data sensitivity ratings transmitting through the secure data corridors, the data sensitivity module 812 may progressively adjust the data sensitivity rating of the secure data corridor in response to progressively quantifying the unknown data sensitivity ratings of the data feeds.

Additionally, the data sensitivity module 814 may lock the data sensitivity rating of a secure data corridor based at least in part on the data sensitivity rating of the adjoining secure data container. For example, a secure data container may have assigned a particular data sensitivity rating based at least in part on an associated use-case. Thus, by locking the data sensitivity rating of the secure data corridor, the data sensitivity module 814 may ensure that data feeds that transmit through the secure data corridor comply with the data sensitivity rating of the use-case.

In the illustrated example, the secure data corridor module 814 may establish a secure data corridor between a subject device and a secure data container. In various examples, the secure data corridor may correspond to a link layer, a network layer, a transport layer, or an application layer of a transmission control protocol (TCP) and internet protocol (IP). Further, secure data corridor module 814 may assign the secure data corridor with a data sensitivity rating that is determined by the data sensitivity module 812.

In the illustrated example, the audit module 816 facilitates a developer or administrator to audit an operation of the resource management platform. The audit module 816 may identify access permissions associated with a subject and compare the access permissions with control parameters of the data feeds. Further, the audit module 816 may interrogate data sensitivity ratings associated with established secure data corridors, secure data containers, and use-cases associated with secure data containers. Additionally, the audit module may ensure that each of the secure data corridors and secure data containers comply with the control parameters of the transmitting data feeds.

There may be a secure data dictionary module 818 that registers all data elements that are used in each secure data channel. Each of the data elements that are registered in the data dictionary module 818 map to data objects, which in turn store the data value at a particular storage location.

In the illustrated example, the resource management platform 802 may further include input/output interface(s) 820. The input/output interface(s) 820 may include any type of output interface known in the art, such as a display (e.g., a liquid crystal display), speakers, a vibrating mechanism, or a tactile feedback mechanism. Input/output interface(s) 820 also include ports for one or more peripheral devices, such as headphones, peripheral speakers, or a peripheral display. Further, the input/output interface(s) 820 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the resource management platform 802 may further include one or more network interface(s) 822. The one or more network interface(s) 822 may include any sort of transceiver known in the art. For example, the one or more network interface(s) 822 may include a radio transceiver that performs the function of transmitting and receiving radio frequency communications via an antenna. In addition, the one or more network interface(s) 822 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the one or more network interface(s) 822 may include wired communication components, such as an Ethernet port or a Universal Serial Bus (USB).

Example Process

Figure 9:
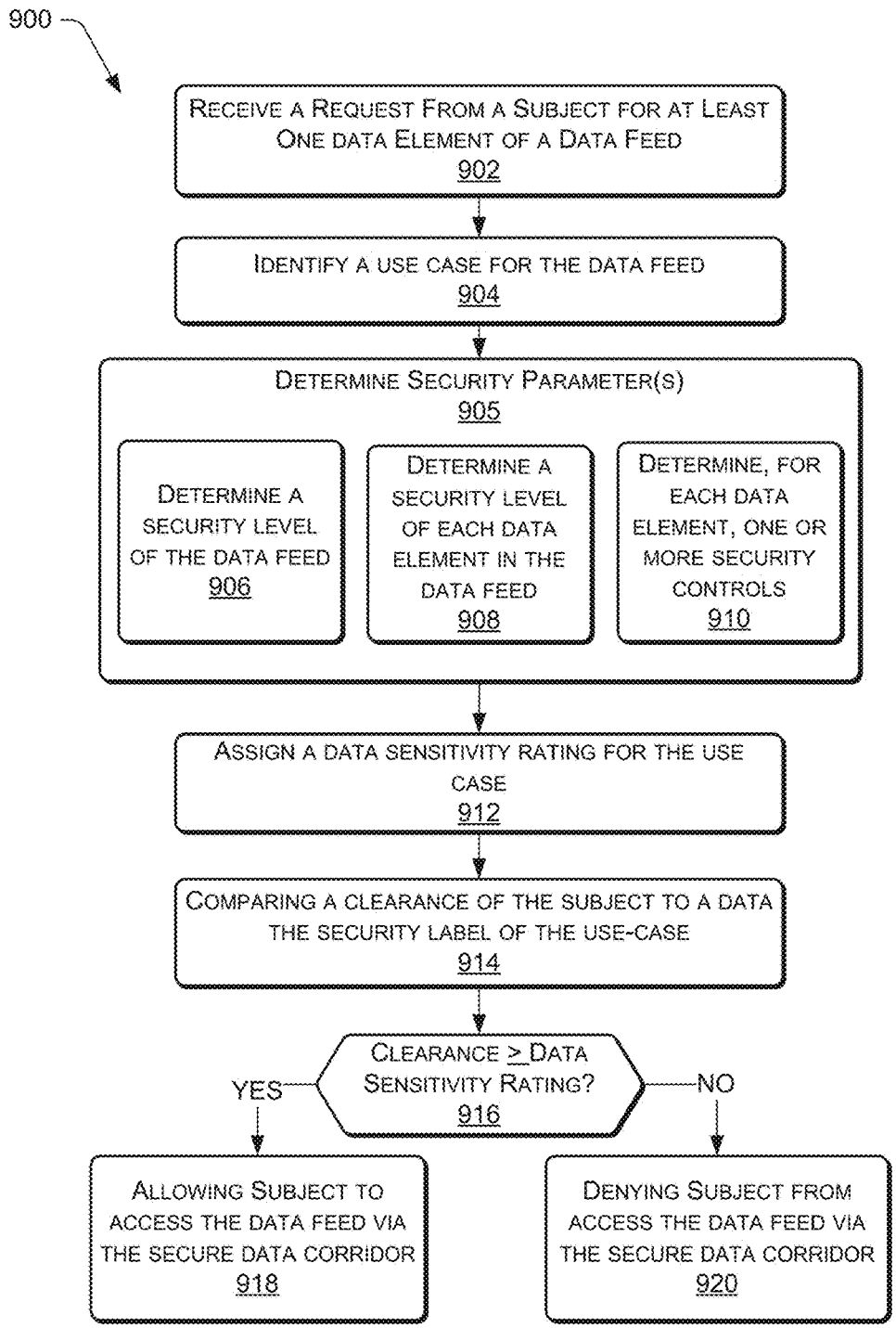
FIG. 9 illustrates an example processes for establishing a session between a requestor subject and a secure data container using a secure data corridor.

With the foregoing overview of an example architecture 100 that facilitates establishing a secure session between a subject and a secure data container via a secure data corridor of FIG. 1 and the various block diagrams of data access relationships of FIGS. 2 to 7, it may be helpful to provide an example process. To that end, FIG. 9 illustrates an example process 900 for establishing a session between a subject and a data feed, which is part of a secure data container, by way of a secure data corridor.

Process 900 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 900 is described with reference to the architecture 100 of FIG. 1.

Process 900 describes establishing a session between a subject and a target data feed comprising one or more data elements, which may be part of a secure data container, using a secure data corridor. In various examples, the subject may correspond to a user, a non-user entity, or another secure data corridor that requests permission to access data feeds within the particular secure data corridor.

At block 902, a resource management platform 110 may receive a request from a subject to access at least one data element of a data feed. This data feed may be part of a secure data container. Each data feed comprises one or more data objects. Each data feed object stores values defined by the corresponding data element.

At block 904, the resource management platform 110 identifies a use-case for the data feed.

At block 905, the resource management platform 110 determines one or more security parameters. For example, the resource management platform 110 may determine, for each data element, a security level of the data feed (i.e., represented by block 906).

Alternatively, or in addition, the resource management platform 110 may determine a security level of each data element in the data feed (i.e., represented by block 908).

Alternatively, or in addition, the resource management platform 110 may determine, for each data element, one or more security controls that are mapped to the corresponding data element (i.e., represented by block 910).

At block 912, the resource management platform 110 assigns a security label for the use-case. In various embodiments, the security label of the use-case may be based on at least one of: (i) the data sensitivity rating of the data feed, (ii) the security level of each data element in the data feed, and (iii) the one or more security controls that are mapped to each data element.

At block 914, the resource management platform 110 compares a clearance of the subject to a security label of the use case having the data feed of interest. In this regard, the request from the subject may include the access permissions associated with the subject. In one embodiment, the authentication server 106 may perform authentication by way of referencing an active directory to confirm the identity and the credentials (e.g., clearance) of the subject.

Upon determining that the clearance of the subject is at or above the data security label of the use-case (i.e., "Yes" at decision block 916), the process continues with block 918, where the resource management platform 110 allows the subject to access the data feed via the secure data corridor.

However, upon determining that the clearance of the subject is below the security label of the use-case (i.e., "No" at decision block 916), the process continues with block 920, where the resource management platform 110 denies the subject to access the data feed via the secure data corridor.

In some embodiments, the data feed may comprise a plurality of data elements (e.g., a first data element having a first security level and a second data element having a second security level, wherein the first security level is more sensitive than the second security level). In this regard, instead of denying the subject from access to the data feed, the resource management platform 110, upon determining that (i) the clearance of the subject is not at or above the data sensitivity rating of the use-case, (ii) the clearance of the subject is below the first security level, and (iii) the clearance of the subject is at or above the second security level, allows the subject privilege to the second data element and denies the subject privilege to the first data element.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It is understood that any specific order or hierarchy of steps in the process disclosed in FIG. 9 are illustrations of exemplary approaches. Based upon design preferences, it is understood that the specific order or hierarchy of steps in the processes may be rearranged, expanded, and some steps omitted. Some of the blocks may be performed simultaneously. For example, not all of the actions of determining a security level of the data feed, determining a security level of each data element in the data feed, or determining one or more security controls need to be performed (i.e., only one of the actions may be sufficient). In some embodiments, the actions of determining a security level of the data feed, determining a security level of each data element in the data feed, or determining one or more security controls may be performed concurrently or one after another (in any order).

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device configured to provide a secure data corridor, the computing device comprising:
   a processor;
   a network interface communicatively coupled to the processor and configured to enable communications with a mobile traffic network;
   a storage device for content and programming;
   a security application stored in the storage device, wherein execution of the security application by the processor configures the computing device to perform acts comprising:
   receiving a request from a subject for at least one data element of a data feed;
   identifying a use-case for the data feed;
   assigning a security label to the use-case that includes a data sensitivity rating of the use-case;
   comparing a clearance of the subject to the security label of the use-case;
   upon determining that the clearance of the subject is at or above the data sensitivity rating of the use-case, allowing the subject access privilege to the data feed via the secure data corridor; and
   assigning an additional data sensitivity rating to the secure data corridor that corresponds with or is substantially similar to a particular data sensitivity rating of the data feed that is transmitted through the secure data corridor.

2. The computing device of claim 1, wherein execution of the security application further configures the computing device to perform acts comprising:
   determining the particular data sensitivity rating of the data feed;
   determining a security level of each data element of the data feed; and determining, for each data element of the data feed, one or more security controls that are mapped to the data element.

3. The computing device of claim 2, wherein assigning the security label includes assigning the security label to the use-case based on at least one of:
the particular data sensitivity rating of the data feed;
the security level of each data element of the data feed; and
the one or more security controls that are mapped to each data element.

4. The computing device of claim 2, wherein the particular data sensitivity rating is a score that quantifies a security measure that mandates a predetermined confidentiality protection and data integrity protection of the data feed.

5. The computing device of claim 2, wherein the particular data sensitivity rating of the data feed, the security level of each data element of the data feed, and the one or more security controls that are mapped to each data element are provided by a data linkage map set (DLMS) table.

6. The computing device of claim 1, wherein the additional data sensitivity rating of the secure data corridor is dynamically set in substantially real-time based on the particular data sensitivity rating of the data feed that is transmitted through the secure data corridor.

7. The computing device of claim 1, wherein the at least one data element is associated with a plurality of data objects, and wherein a data object of the plurality of data objects is configured to store one or more data elements mapped to the data object at a storage location.

8. The computing device of claim 1, wherein execution of the security application further configures the computing device to perform acts comprising: upon determining that a subject has access privilege to the data feed, allowing the subject to access all data elements and data objects related to the data feed.

9. The computing device of claim 1, wherein:
the data feed comprises a first data element having a first security level and a second data element having a second security level; and
the first security level is more sensitive than the second security level.

10. The computing device of claim 9, wherein execution of the security application further configures the computing device to perform acts comprising: upon determining that (i) the clearance of the subject is not at or above the data sensitivity rating of the use-case, (ii) the clearance of the subject is below the first security level, and (iii) the clearance of the subject is at or above the second security level, allowing the subject access privilege to the second data element and denying the subject access privilege to the first data element.

11. The computing device of claim 9, wherein execution of the security application further configures the computing device to perform acts comprising: upon determining that (i) the clearance of the subject is not at or above the data sensitivity rating of the use-case, (ii) the clearance of the subject is below the first security level, and (iii) the clearance of the subject is at or above the second security level:
allowing the subject to write to but not read from the first data element; and
allowing the subject to write to and read from the second data element.

12. The computing device of claim 9, wherein execution of the security application further configures the computing device to perform acts comprising: upon determining that the clearance of the subject is at or above the first security level:
allowing the subject to read from but not write to the second data element; and
allowing the subject to write to and read from the first data element.

13. The computing device of claim 3, wherein control parameters of a security control mapped to a data element include at least one of following limitations: (i) no read-up, (ii) no write-down, (iii) tranquility, (iv) explicit read-in, or (v) explicit write-out.

14. A non-transitory computer-readable medium having stored thereon a plurality of sequences of instructions which, when executed by a processor, cause the processor to perform a plurality of actions comprising:
receiving a request from a subject for at least one data element of a data feed;
identifying a use-case for the data feed;
assigning a security label to the use-case that includes a data sensitivity rating of the use-case;
comparing a clearance of the subject to the security label of the use-case;
upon determining that the clearance of the subject is at or above the data sensitivity rating of the use-case, allowing the subject access privilege to the data feed via a secure data corridor; and
assigning an additional data sensitivity rating to the secure data corridor that corresponds with or is substantially similar to a particular data sensitivity rating of the data feed that is transmitted through the secure data corridor.

15. The non-transitory computer-readable medium of claim 14, wherein the actions further comprise:
Determining the particular data sensitivity rating of the data feed;
determining a security level of each data element of the data feed; and
determining, for each data element of the data feed, one or more security controls that are mapped to the data element.

16. The non-transitory computer-readable medium of claim 15, wherein assigning the security label includes assigning the security label to the use-case based on at least one of:
the data sensitivity rating of the data feed;
the security level of each data element of the data feed; and
the one or more security controls that are mapped to each data element.

17. The non-transitory computer-readable medium of claim 14, wherein the actions further comprise: upon determining that a subject has access privilege to the data feed, allowing the subject to access all data elements and data objects related to the data feed.

18. The non-transitory computer-readable medium of claim 14, wherein:
the data feed comprises a first data element having a first security level and a second data element having a second security level; and
the first security level is more sensitive than the second security level.

19. The non-transitory computer-readable medium of claim 18, wherein the actions further comprise: upon determining that (i) the clearance of the subject is not at or above the data sensitivity rating of the use-case, (ii) the clearance of the subject is below the first security level, and (iii) the clearance of the subject is at or above the second security level, allowing the subject access privilege to the second data element and denying the subject access privilege to the first data element.

20. The non-transitory computer-readable medium of claim 18, wherein the actions further comprise:
  upon determining that (i) the clearance of the subject is not at or above the data sensitivity rating of the use-case, (ii) the clearance of the subject is below the first security level, and (iii) the clearance of the subject is at or above the second security level:
    allowing the subject to write to but not read from the first data element; and
    allowing the subject to write to and read from the second data element; and
  upon determining that the clearance of the subject is at or above the first security level:
    allowing the subject to read from but not write to the second data element; and
    allowing the subject to write to and read from the first data element.

* * * * *